United States Patent [19]

Wilson

[11] Patent Number: 5,022,089
[45] Date of Patent: Jun. 4, 1991

[54] METHOD AND APPARATUS FOR FAST REGISTRATION USING CROSSHAIR REGISTER MARKS

[76] Inventor: Monti R. Wilson, 7906 W. 99th St., Overland Park, Kans. 66212

[21] Appl. No.: 467,264

[22] Filed: Jan. 19, 1990

[51] Int. Cl.$^5$ .............................................. G06K 9/32
[52] U.S. Cl. ........................................ 382/44; 382/45
[58] Field of Search ...................... 382/44, 30, 45, 61

[56] References Cited

U.S. PATENT DOCUMENTS

| | | | |
|---|---|---|---|
| 4,136,332 | 1/1979 | Kadota et al. | 382/45 |
| 4,253,112 | 2/1981 | Doemens | 382/44 |
| 4,403,339 | 9/1983 | Wevelsiep et al. | 382/61 |
| 4,589,144 | 5/1986 | Namba | 382/61 |
| 4,644,582 | 2/1987 | Morishita et al. | 382/44 |
| 4,829,375 | 5/1989 | Alzmann et al. | 358/101 |

Primary Examiner—Stephen Brinich
Attorney, Agent, or Firm—Kokjer, Kircher, Bradley, Wharton, Bowman & Johnson

[57] ABSTRACT

A method and apparatus for locating the centers of crosshair register marks and using the mark center locations to register the color film separations or other objects which bear the register marks. A digital picture is taken of each mark, and the picture image is transformed into a picture in which the pixels range between 0 and 1. Weighting windows are constructed and scanned over the pictures along the x and y axes to record the intensity level at each pixel location. Weighted summation calculations are then made to determine the intensity centroid location in x and y. A special screening technique is used to reject contributions of dirt, dust and other noise to enhance the accuracy.

24 Claims, 2 Drawing Sheets

Fig. 1.

METHOD AND APPARATUS FOR FAST REGISTRATION USING CROSSHAIR REGISTER MARKS

FIELD OF THE INVENTION

This invention relates to the registration of halftone color separation film and other materials having crosshair register marks on the borders. More particularly, the invention is directed to a method and apparatus that employs improved crosshair registration techniques for rapidly, accurately and repeatably registering color separation films so that high quality color pictures can be printed.

BACKGROUND AND SUMMARY OF THE INVENTION

U.S. Pat. No. 4,614,244 to Wilson et al discloses a method and apparatus for registering color separation film. One algorithm disclosed in the patent is an algorithm for determining the center of a crosshair fiducial or register mark of the type often provided on the border areas of film separations. In the patented method, the computed offsets between register mark centers determines the basis for the registration of color separation films containing register marks on the image borders. This algorithm performs adequately at the accuracy standards of the method and apparatus of U.S. Pat. No. 4,614,244.

However in recent years, the accuracy requirement for register marks and sharp edged detail in general has been tightened to an error of no more than $\frac{1}{4}$ mil in final registration accuracy. This demanding accuracy requirement of professional strippers, namely registration errors of no greater than $\frac{1}{4}$ mil for register marks and other sharp edged detail, has required that algorithmic techniques be upgraded in accuracy.

Pending application Ser. No. 389,855, filed on Aug. 4, 1989 in the name of Wilson et al, discloses an edge based registration algorithm which is accurate enough to meet the requirements of professional strippers, and it has indeed been applied in applications involving register marks. This algorithm requires, however, a significant time to compute registration. Since the productivity of the method and apparatus increases with decreasing cycle time (algorithm time plus machine time plus operator time) it is highly desirable to have a register mark algorithm that requires minimal computation time and yet is as accurate as the edge based algorithm for use in applications where the machine operators find judicious benefit from performing some of their color film separation registration with the aid of register marks.

Although register mark applications are fewer in number than applications requiring the registration of halftone detail, there is a growing need for a specialized registrations machine which is applicable to register marks. For example, there has been a recent proliferation of films from satellite transmissions which nearly always have fiducial marks. For such specialized applications, it is beneficial to make use of a highly specialized yet very fast algorithm for the mark registration, in comparison to the use of slower, more general purpose algorithm.

The present invention is directed to an algorithmic based method and apparatus that uses a digital image gray level centroid ("center of gravity") technique to compute the center locations of symmetric crosshair register marks. This centroid technique is tailored to be fast, accurate, repeatable, and robust in the sense of being exceedingly insensitive to the presence of dust and dirt "noise" on the crosshair image.

In accordance with the invention, a gray level weighted centroid computation is performed in a manner to avoid errors caused by dust, dirt, scratches or other "noise". The x and y centroid coordinates are computed separately by using a weighting window that is perpendicular to the centroid direction. By using a unique screening process to discard contributions made by extraneous noise, highly accurate results within the requisite $\frac{1}{4}$ mil accuracy standard are achieved, with insensitivity to noise and minimal computational time required.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

In accordance with the present invention, color separation films and other materials having crosshair register marks on the borders of the image are registered through the use of a machine constructed in the manner shown and described in U.S. Pat. No. 4,849,914 which issued to Medioni et al on July 18, 1989 and which is incorporated herein by reference. The machine operates to carry out the present invention in substantially the same manner disclosed in the above referenced patent, except that different algorithmic processes are used, as will be described hereinafter. In addition to color separation films, other materials having crosshair register marks can be registered by the techniques of the present invention. For example, multi-layer printed circuit boards can be registered, along with other objects which have at least two crosshair register marks located in a border region that surrounds the region of primary interest and arranged such that when the register marks are aligned on two different objects, the regions of primary interest will be in registration. However, to facilitate describing the invention, color separation films will be referenced as the objects to be registered.

Figure 1:
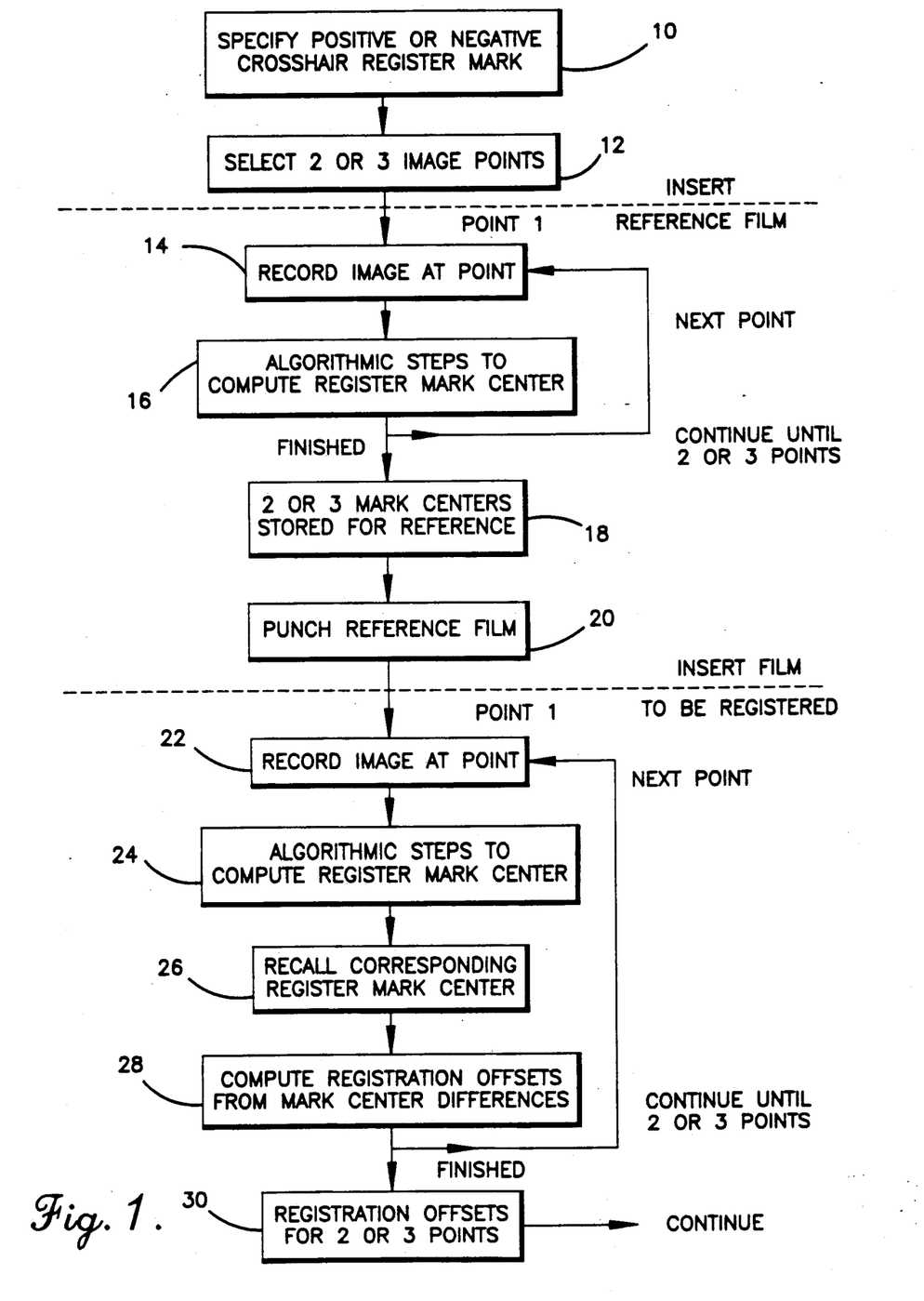
FIG. 1 is a flow chart for the algorithmic processes carried out in accordance with the present invention.

FIG. 1 depicts a flow chart of the steps that are followed in order to register a pair of color separation films in accordance with the present invention. First, a choice is made in block 10 between "negative" register marks (white register marks on a black background) or "positive" register marks (black marks on a white background). Next, block 12 is entered and the choice is made to use either two or three register marks. Typically, two point registration is entirely satisfactory, as three point registration is required principally when the detail to be registered is scanned into the separations with global image stretching or when internal misregister problems are present. In the case of crosshair register marks, global image stretching and internal misregistration are not normally encountered, so there is ordinarily no compelling reason to use three point registration and the added computational time associated with three point registration can be avoided by using two point registration. Nevertheless, if computational time is not important and there is reason to provide a general solution that takes into account global image stretching in both directions and internal misregistration problems, it is possible to make use of three registration points to provide such a general solution, as described more fully in pending application Ser. No. 389,855, filed on Aug. 4, 1989 by Wilson et al and incorporated herein by reference.

After the choice has been made to use either two or three register marks, one of the films, arbitrarily selected as the reference film (R), is inserted into the machine. A digital image of the first register mark (point 1) is then recorded in block 14. The image is processed algorithmically in block 16 to produce a computed center for the first register mark, as will be more fully explained. The procedures indicated in blocks 14 and 16 are repeated for the other register marks on the reference film (R), until centers have been computed for all reference film marks. The computed centers are stored in block 18, and the reference film is punched with a pair of holes in block 20.

The next film (M) which is to be registered is inserted into the machine after the punched reference film has been removed. In block 22, a digital image is recorded of the register mark on the film M (point 1) which corresponds to the first register mark on the reference film. The algorithmic steps required to produce the center of the first register mark on the film M are then carried out in block 24. The center of the corresponding register mark on the reference film is recalled from storage in block 26, and, with the centers of the corresponding marks on the two films known, the registration offset (the offset between the two marks) is computed in block 28.

The processes indicated in blocks 22-28 are then repeated for the remaining register marks on the film M until the registration offsets for either two or three register marks have been computed and are available in block 30. By convention, the registration equation is REFERENCE=MOVED+OFFSET, indicating that registration is achieved by shifting the moved film M by the offset in both the x and y directions in a conventional x-y coordinate system. Accordingly, the registration offsets for the ith registration point are given by:

$$\text{offset}(i,x) = x_{Ri} - x_{Mi} \quad (1)$$

$$\text{offset}(i,y) = y_{Ri} - y_{Mi}$$

where $x_{Ri}, y_{Ri}$ are the algorithmically computed coordinates of the center of the ith point on the reference film R (computed in block 16) and $x_{Mi}, y_{Mi}$ are the algorithmically computed coordinates of the center of the corresponding ith point on the moved film M (computed in block 24).

With the offsets computed in accordance with equations (1) in block 30, registration of the film proceeds in the manner described in the aforementioned pending application Ser. No. 389,855 and illustrated in particular by the flow chart that forms FIG. 1 thereof.

Figure 2:
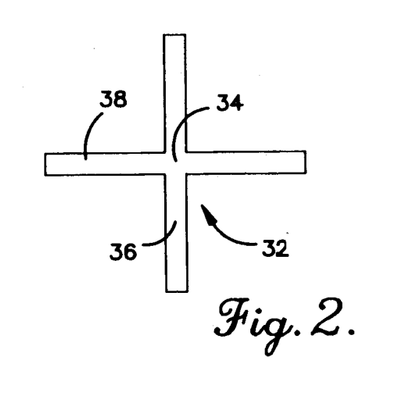
FIG. 2 is a diagrammatic illustration depicting a crosshair register mark of the type located on the border areas of some color film separations.

The present invention provides improved techniques for algorithmically computing the register mark centers in blocks 16 and 24. The digital images that are captured in blocks 14 and 22 are preferably 640 pixels by 640 pixels which capture the entirety of the crosshair register marks. Referring now to FIG. 2, a register mark generally identified by numeral 32 is symmetric about its center 34 and includes crisscrossing and mutually perpendicular arms or bars 36 and 38, with bar 36 being vertical or extending in the y direction and bar 38 being horizontal or extending in the x direction. One half of the length of each bar 36 and 38 is located on each side of the center 34. With pixels 0.5118 mil square, an end to end length of each bar of 150 mils and a bar width of 7 mils (about 14 pixels) have proven to be satisfactory. No detail should be present within 150 mils of the center 34.

When the digital picture of the register mark 32 is taken, the bars 36 and 38 should be close to precise vertical and horizontal orientations, with minimal rotational disorientation present. A template or other guide (not shown) can be used to achieve careful alignment and minimize rotation. The films should be placed on the registration machine such that they are in rough registration within a tolerance of about 40 mils.

The digital picture that is captured on each register mark has 256 levels of gray ranging from 0 to 255 numerically. For numerical accuracy and weighting purposes, the gray level picture is transformed through use of a linear transformation into a picture that ranges quasi-continuously over 0 (representing white) to 1 (representing black) for a "positive" mark (a black mark on a white background) or 0 (representing black) to 1 (representing white) for a "negative" mark (a white mark on a black background). The linear transformations are for a positive mark:

$$G(final) = (max\ gray - G(gray))/(max\ gray - min\ gray)$$

and for a negative mark:

$$G(final) = (G(gray) - min\ gray)/(max\ gray - min\ gray) \quad (2)$$

where G(final) ranges over 0 to 1, max gray and min gray are the respective maximum and minimum gray levels in the picture, and G(gray) is the gray level for the pixel that is undergoing the transformation.

The lighting for the digital picture should be spatially uniform over the entire image. To achieve this, the light source can be adjusted with the aid of trial scans that display a 16×16 grid of average gray levels over the 640×640 pixel image. By exercising care to assure light uniformity, spurious variations in the captured gray levels are reduced to an acceptable level.

Image processing techniques that are relatively straightforward can be used to compute the centroid of all gray level pixels and arrive at a weighted mean position. However, such techniques are inadequate for computing a register mark center because they are sensitive to extraneous "noise" which is nearly always present to come extent on a real image of a register mark in the form of dirt, dust, scratches or other image defects. Consequently, the present invention employs a novel technique which is specifically designed to resist noise and prevent it from introducing errors.

Figure 3:
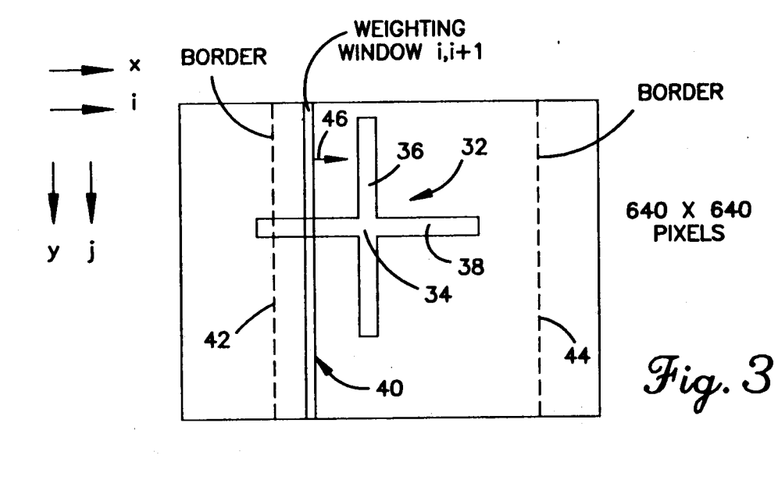
FIG. 3 is a diagrammatic illustration depicting a weighting window which is used to locate the x centroid of a crosshair register mark in accordance with the invention.

In accordance with the invention, the x and y centroids are computed separately by using summation or weighting windows that are perpendicular to the centroid directions in the x,y coordinate system. FIG. 3 depicts diagrammatically the geometry for the x centroid determination. A weighting window is identified by numeral 40 and is two pixels wide, comprising two adjacent vertical columns of pixels which are perpendicular to the i or x direction. The window 40 is passed across the digital image at every location in i, but stepping of the window in i is restricted to within borders defined by the vertical lines 42 and 44 on the left and right. The lines 42 and 44 are typically 150 pixels inside of the left and right vertical borders of the image. The borders assist both in excluding extraneous image detail and in speeding the computations. At the same time, the locations of the borders prevent exclusion of the vertical bar 36.

The length of the window 40 is the full 640 pixel dimension of the image to assure coverage of the entire length of bar 36. The two pixel (i,i+1) width of the weighting window gives it sufficient width to enable it to avoid problems that might result from slight rotational disorientation that may be present. The window 40 is scanned incrementally across the mark 32 from left to right between the border lines 42 and 44, as indicated by the directional arrow 46.

A summation of G(final) pixel intensities is performed over all pixels in the window 40 at each location j in the x direction. The x centroid xc or the x coordinate of the center 34 of the register mark is given by the expression:

$$xc = \frac{\sum_{\{i\}} (\text{sum pair})i \left(i + \frac{1}{2}\right)}{\sum_{\{i\}} (\text{sum pair})i} \quad (3)$$

where {i} indicates that a window summation contribution is allowed only if that contribution (sum pair)i is closer to the maximum overall (sum pair)i than to the average minimum (sum pair)i taken over (for example) 5i samples in from the border.

This {i} screening process is effective in making the algorithm highly resistant to digital image noise. A noise contribution would have to be extremely large (which is unusual) to be closer to the maximum window sum containing many transformed gray levels near maximum than to the average sum value representative of the normal background noise level. At the same time, the screening technique avoids discarding valid data. Consequently, the screening technique virtually eliminates the noise problem from a practical standpoint and avoids the unacceptable accuracy that can otherwise be caused when noise is present.

Figure 4:
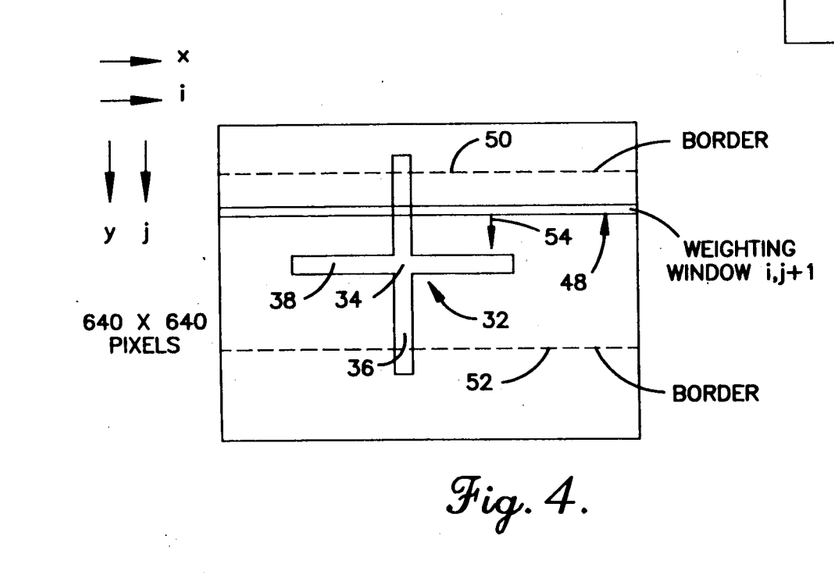
FIG. 4 is a diagrammatic illustration depicting a weighting window which is used to locate the y centroid of a crosshair register mark in accordance with the invention.

Computation of the y centroid is analogous to the x centroid computation. Referring to FIG. 4, a weighting window 48 is formed by a pair of adjacent horizontal rows of pixels extending the full 640 pixel side to side dimension of the image and oriented perpendicular to the j or y direction. The window 48 is passed downwardly between the borders indicated by the lines 50 and 52 which are preferably about 150 pixels inside of the picture from the top and bottom picture edges. The directional arrow 54 indicates the directional stepping of the window 48 in the y direction so that it covers the entirety of the horizontal bar 38.

A summation of the G(final) pixel intensities is performed over all pixels in the window 48 at each location j in the y direction. The y centroid yc is given by:

$$yc = \frac{\sum_{\{j\}} (\text{sum pair})j \left(j + \frac{1}{2}\right)}{\sum_{\{j\}} (\text{sum pair})j} \quad (4)$$

where the notation {j} indicates that a window summation contribution is allowed only if it meets the criterion previously set forth for the x centroid. Again, this screening or noise suppression technique virtually eliminates the problem of inaccuracy due to noise.

The gray level weighted centroid technique for locating the center of a crosshair register mark is clearly less time consuming from a computational standpoint than using optimum thresholding algorithmic processes to produce a binary (levels 0 and 1) picture. In addition, the accuracy is enhanced, as can be appreciated by referring to FIG. 5 which depicts diagrammatically a one dimensional situation that can be encountered using the techniques of the present invention. The register mark portion which covers the photosites 1 through n is identified by numeral 56, and it overlaps the right most (n+1) photosite pixel 58 only partially to leave pixel 58 with an open fraction f. With the gray level for covered photosite pixels taken as one, the gray level for the partially covered pixel 58 is 1-f.

Figure 5:
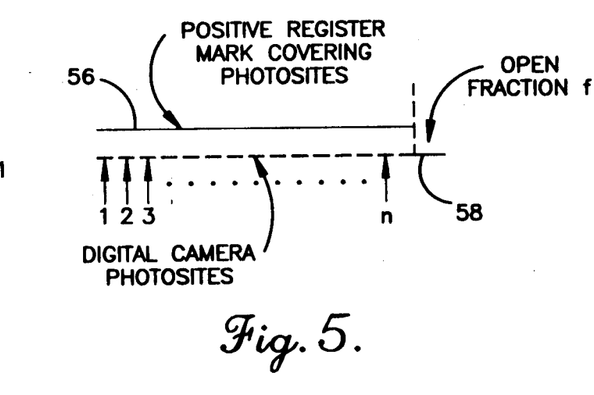
FIG. 5 is a diagrammatic illustration of a onedimensional model centroid situation.

The exact center for the model of FIG. 5 is given by:

$$\text{exact center} = \frac{\frac{1}{2} + n + \frac{1}{2} + 1 - f}{2} = 1 + \frac{n-f}{2} \quad (5)$$

The centroid for the model in binary approximation is computed assuming that the end gray level is below threshold and is missed entirely. Thus:

$$\text{binary centroid} = \frac{\sum_{k=1}^{n} k(1)}{\sum_{k=1}^{n} (\ )} = \frac{n}{2} + \frac{1}{2} \quad (6)$$

The difference between the binary centroid and the exact center is $\frac{1}{2}-f/2$ which yields a large error of 0.5 pixel for f tending to 0. On the other hand, the gray level centroid is $$\text{gray level centroid} = \quad (7)$$

$$\frac{\left[\sum_{k=1}^{n} k(1)\right] + (n+1)(1-f)}{\left[\sum_{k=1}^{n} (1)\right] + 1 - f} = \frac{\frac{n}{2} + 1 - f}{1 - \frac{f}{n+1}}$$

In this case, the difference is zero for f=0 or f=1 an maximum when f=½. The residual error term in the large n approximation is:

$$\text{exact centroid} - \text{gray centroid} \approx \quad (8)$$

-continued $$\left. \frac{-f}{n+1-f} \times \frac{1}{2} \right|_{\max \text{ at } f = \frac{1}{2}} \text{ mils}$$

Thus, the error is very small (on the order of 1/n), demonstrating that the accuracy of the gray level centroid determination of the present invention is greater than the binary centroid computation.

The technique of the present invention was tested employing color separation films having positive crosshair registration marks with the bars 14 pixels wide and about 400 pixels long (end to end with the bars 36 and 38). The registration machine was set to a self-test mode of operation in which a film is registered to itself and the registration offsets are computed from equations (1) and recorded. Rotation is virtually eliminated in this case.

Table 1 sets forth the offset results for twelve registrations:

TABLE 1

| Registration Offsets (Mils) | | | |
|---|---|---|---|
| X1 | Y1 | X2 | Y2 |
| .004 | .008 | .003 | .022 |
| −.004 | .016 | .014 | .022 |
| .003 | −.004 | .176 | .031 |
| .001 | .014 | .321 | −.019 |
| .003 | .023 | .169 | .009 |
| .001 | .012 | .325 | −.002 |
| −.172 | .007 | −.137 | .006 |
| −.157 | .006 | −.157 | −.003 |
| −.188 | .015 | −.125 | −.001 |
| .023 | .003 | −.007 | .011 |
| .018 | −.001 | −.167 | −.004 |
| .031 | −.006 | −.328 | −.007 |

It is apparent from Table 1 that the smaller errors range from 0 to about 0.03 mil in magnitude. These results correlate well with twice the maximum error estimate predicted by equation (8), which is about 0.03 mils. Twice the estimate given by equation (8) is an approximate error estimation because the difference in equation (1) can be a source of error doubling. The repeatability error due to the mechanical motion table that holds the film separations tends to be either negligible or small but finite starting at about 0.1 mil, as Table 1 reflects. It is to be expected that the larger errors caused by motion table repeatability error fall outside the one standard deviation confidence limit of 67%. In fact, the number of errors of 0.1 mil or larger reflected by Table 1 is 12 out of 48 total data samples or 25%, which is nearly 100% −67% =33%, a favorable comparison.

With rotation virtually eliminated, the net registration errors are very small (several hundredths of a mil), as reflected by Table 1. However, rotation can create a source of error greater than the error due to the gray level weighted centroid computation. The symmetric registration mark bar weighting in the centroid computations acts to counter the rotational effects and produce a mark center very near the true center. However, the bar symmetry is slightly broken by the fact that the pixel at the mark center will not always be divided symmetrically. The maximum asymmetry from this effect is $\frac{1}{4}$ pixel, and the asymmetry generates through the rotation bar a maximum error magnitude of:

$$\left(\frac{1}{2}\right)2\left(\frac{4\ WPIX}{L}\right) \times \frac{1}{2} \text{ mils } \left(\frac{1}{2} \text{ mil pixels}\right) \quad (9)$$

assuming $\frac{1}{2}$ mil pixels. The factor 2 in equation (9) is due to error doubling in equation (1), and WPIX is a bar width maximum rotation error over L with an effective most significant rotation arm length of L/4 pixels, where L is the length of the bar. With WPIX equal to 14 pixels and L equal to 200 pixels, the error estimate is about 0.3 pixel or about 0.15 mil. The mechanical error due to machine motion and punching can contribute about 0.25 mil additionally, giving a maximum error of about 0.15 mil +0.25 mil=0.4 mil, still below the 0.5 mil total registration error that is considered acceptable. The amount of rotation introduced by the rough registration process varies from film to film, but it never exceeds a full mark width displacement over L, as assumed in the worst case error estimate.

Another test of the techniques of the present invention involved registering 20 different sets of four films each, with the registration errors measured by microscope and visually estimated to the nearest $\frac{1}{4}$ mil. The results are tabulated in Table 2:

TABLE 2

| Registration Error (Mils) | | | |
|---|---|---|---|
| X1 | Y1 | X2 | Y2 |
| −.25 | −.25 | 0 | .50 |
| −.50 | .25 | 0 | .25 |
| −.25 | 0 | .25 | −.25 |
| −.25 | 0 | .50 | .25 |
| .50 | 0 | −.50 | −.50 |
| −.25 | 0 | .25 | −.25 |
| 0 | 0 | 0 | .50 |
| −.25 | .25 | 0 | .25 |
| −.50 | .25 | 0 | .25 |
| 0 | 0 | 0 | −.25 |
| 0 | .25 | 0 | 0 |
| −.25 | 0 | 0 | 0 |
| −.25 | 0 | 0 | .50 |
| 0 | .25 | 0 | 0 |
| 0 | 0 | 0 | 0 |
| −.25 | 0 | .25 | .25 |
| 0 | 0 | 0 | 0 |
| 0 | .25 | −.25 | 0 |
| 0 | 0 | 0 | .25 |
| 0 | .25 | 0 | 0 |
| 0 | −.25 | 0 | 0 |
| 0 | .25 | 0 | 0 |
| 0 | .50 | 0 | .25 |
| 0 | .50 | 0 | .25 |
| −.50 | .25 | 0 | .50 |
| 0 | .50 | −.25 | 0 |
| 0 | .50 | 0 | 0 |
| 0 | 0 | 0 | 0 |
| 0 | .50 | 0 | 0 |
| 0 | .25 | 0 | .25 |
| 0 | −.25 | 0 | .25 |
| 0 | .50 | .25 | 0 |
| 0 | .50 | 0 | .25 |
| 0 | .50 | 0 | .25 |
| 0 | .25 | .25 | 0 |
| −.25 | .50 | 0 | .25 |
| 0 | −.25 | 0 | 0 |
| 0 | .50 | 0 | 0 |
| 0 | .25 | 0 | 0 |
| 0 | .50 | 0 | .25 |
| 0 | 0 | 0 | .50 |
| −.25 | .50 | 0 | 0 |
| 0 | 0 | .25 | 0 |
| 0 | 0 | 0 | 0 |
| 0 | .25 | .25 | 0 |
| 0 | .50 | .25 | 0 |
| 0 | 0 | 0 | .50 |
| 0 | .25 | .25 | 0 |

TABLE 2-continued

| | Registration Error (Mils) | | |
|---|---|---|---|
| X1 | Y1 | X2 | Y2 |
| 0 | .50 | 0 | .25 |
| 0 | .50 | .25 | 0 |
| −.25 | .50 | .25 | .50 |
| −.25 | 0 | 0 | .25 |
| 0 | .50 | 0 | 0 |
| −.50 | 0 | 0 | 0 |
| 0 | .50 | 0 | 0 |
| 0 | .50 | −.25 | 0 |
| −.25 | .50 | 0 | 0 |
| −.25 | 0 | 0 | 0 |

The results reflected in Table 2 can be summarized as follows:

| | |
|---|---|
| $x_1$ average | −.090160 |
| $x_1$ standard deviation | .175513 |
| $x_1$ 95% accuracy | .441190 |
| $y_1$ average | .204918 |
| $y_1$ standard deviation | .258099 |
| $y_1$ 95% accuracy | .721160 |
| $x_2$ average | .036885 |
| $x_2$ standard deviation | .149013 |
| $x_2$ 95% accuracy | .334912 |
| $y_2$ average | .106557 |
| $y_2$ standard deviation | .204754 |
| $y_2$ 95% accuracy | .516065 |

As Table 2 reflects, the measured registration errors never exceed ½ mil in magnitude, and this is within prevailing error tolerances and thus acceptable. The errors that are near the ½ mil limit are for positive register marks having a bar width of 14 pixels and a bar length of 200 pixels. Negative marks 14 pixels wide were tested with no discernible degradation in accuracy. Smaller negative marks (10 pixels wide) were tested with equally good results. It is an accepted "rule of thumb" in machine vision that a recognizable feature must be at least 4 pixels across, so a lower limit on mark width would be about 2 mil thickness marks. However, minimization of error tends to favor thicker marks with longer bars.

The images used in the tests identified above were not cleaned and contained considerable amounts of noise in the form of dirt and dust on the image surfaces. This situation (the presence of noise) is typical in the graphic arts field and is the reason that a successful registration algorithm must be highly robust and insensitive to image noise. Registrations have been carried out in accordance with the present invention even in the presence of gross noise taking the form of stripping tape intruding into the image area (but not occluding the register mark).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A method of registering a pair of objects each having a border region presenting spaced apart first and second register marks alignable to effect registration of the objects and each including a pair of mutually perpendicular bars, said method comprising the steps of:

recording a digital picture of each register mark on each object;

assigning to each pixel in each digital picture a numerical value representative of the pixel intensity;

scanning each picture systematically to record the coordinate location of each pixel and the numerical value of each pixel; and calculating the intensity centroid location of each picture using the pixel locations and numerical values, thereby locating the center of each register mark to determine the translation movement necessary to align the corresponding register mark centers.

2. The method of claim 1, wherein said scanning step comprises:

constructing a coordinate system having mutually perpendicular x and y coordinate directions oriented parallel to the bars of the register mark;

erecting a pair of mutually perpendicular weighting windows extending parallel to the bars;

passing the window that is parallel to the y coordinate direction incrementally in the x coordinate direction over preselected pixels in each picture which contain the pixels of the bar oriented parallel to the y coordinate direction; and passing the window that is parallel to the x coordinate direction numerically in the y coordinate direction over preselected pixels which contain the pixels of the bar oriented parallel to the x coordinate direction, said calculating step comprising calculating separately the weighted mean intensity centroid location in the x and y coordinate directions.

3. The method of claim 2, wherein said erecting step comprising providing each window with a two pixel width dimension to resist error due to rotational effects.

4. The method of claim 2, wherein said calculating step comprises rejecting the contribution of the pixels at each incremental position of each window unless said contribution exceeds in numerical value a preselected screening value.

5. The method of claim 3, wherein said calculating step comprises:

computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the window that is parallel to the y coordinate direction, and the condition {i} indicates that at each coordinate i of the window that is parallel to the y coordinate, the contribution of the numerical values of the pixels in the window are disregarded unless the sum of the numerical values exceeds a preselected screening value;

computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

where $y_c$ is the y coordinate of the intensity centroid, j is the range of y coordinate locations of the window that is parallel to the x coordinate direction, and the condition {j} indicates that at each coordinate j of the window that is parallel to the x coordinate, the contribution of the numerical values of the pixels in the window are disregarded unless the sum of the numerical values exceeds a preselected screening value.

6. A method of registering a pair of objects each having a border region presenting spaced apart crosshair register marks alignable to effect registration of the objects and each having mutually perpendicular first and second bars, said method comprising the steps of:
recording a digital picture of each register mark on each object;
assigning to each pixel in each register mark a numerical value representative of the pixel intensity;
constructing a coordinate system having an x axis perpendicular to the first bar of each mark and a y axis perpendicular to the second bar of each mark;
erecting a first scanning window parallel to the y axis and having a width equal to a preselected number of pixels;
systematically scanning said first window in sequential increments in the direction of the x axis over at least the pixels which contain the first bar of each mark to record the x location and numerical value of each pixel scanned at each incremental position of said first window;
calculating the x coordinate centroid location based on a weighted mean determination using the x location and numerical values of the pixels;
erecting a second scanning window parallel to the x axis and having a width equal to a preselected number of pixels;
systematically scanning said second window in sequential increments in the direction of the y axis over at least the pixels which contain the second bar of each mark to record the y location and numerical value of each pixel scanned at each incremental position of said second window;
calculating the y coordinate centroid location based on a weighted mean determination using the y location and numerical values of the pixels; and
determining the offsets in the x and y coordinates for each corresponding pair of register marks to thereby determine the translational movement necessary to register the objects.

7. The method of claim 6, wherein:
said step of calculating the x coordinate centroid location comprises rejecting the contribution of the pixels at each incremental position of said first window unless said sum of the numerical values of the pixels exceeds a preselected screening value; and
said step of calculating the y coordinate centroid location comprises rejecting the contribution of the pixels at each incremental position of said second window unless said sum of the numerical values of the pixels exceeds a preselected screening value.

8. The method of claim 6, wherein:
said step of calculating the x coordinate centroid location comprises computing the centroid computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the window that is parallel to the y coordinate direction, and the condition {i} indicates that at each coordinate i of the window that is parallel to the y coordinate, the contribution of the numerical values of the pixels in the window are disregarded unless the sum of the numerical values exceeds a preselected screening value; and
said step of calculating the y coordinate centroid location comprises computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

where $y_c$ is the y coordinate of the intensity centroid, j is the range of y coordinate locations of the window that is parallel to the x coordinate direction, and the condition {j} indicates that at each coordinate j of the window that is parallel to the x coordinate, the contribution of the numerical values of the pixels in the window are disregarded unless the sum of the numerical values exceeds a preselected screening value.

9. A method of locating the center of a crosshair register mark having first and second mutually perpendicular bars, said method comprising the steps of:
recording a digital picture of a region which contains a crosshair register mark having first and second mutually perpendicular bars;
assigning to each pixel in said region a numerical value based on the pixel intensity;
erecting first and second mutually perpendicular weighting windows oriented substantially parallel to the respective first and second bars
systematically scanning each window incrementally in a direction perpendicular to the window over pixels which include the pixels containing the corresponding bar;
recording numerical values corresponding to the intensities of the pixels at each incremental position of each window; and
calculating for each window a weighted mean intensity centroid location corresponding to the location of the corresponding bar, whereby the coordinates of the center of the mark are determined by the centroid location coordinates.

10. The method of claim 9, wherein each window has a width of two pixels.

11. The method of claim 9, wherein said calculating step comprises rejecting the contribution to said weighted mean intensity centroid of the pixels at each incremental position of each window unless the sum of the numerical values of the pixels exceeds a preselected screening value effective to screen out the contribution of extraneous noise.

12. The method of claim 9, wherein said calculating step comprises:
erecting an x,y coordinate system having x and y axes parallel to the bars;
computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the first window, and the condition {i} indicates that at each coordinate i of the first window, the contribution of the numerical values of the pixels in the first window are disregarded unless the sum of the numerical values exceeds a preselected screening value; and
computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

where $y_c$ is the y coordinate of the intensity centroid, j is the range of y coordinate locations of the second window, and the condition {j} indicates that at each coordinate j of the second window, the contribution of the numerical values of the pixels in the second window are disregarded unless the sum of the numerical values exceeds a preselected screening value.

13. An apparatus for registering a pair of objects each having a border region presenting spaced apart first and second register marks alignable to effect registration of the objects and each including a pair of mutually perpendicular bars, said apparatus comprising:
means for recording a digital picture of each register mark on each object;
means for assigning to each pixel in each digital picture a numerical value representative of the pixel intensity;
means for scanning each picture systematically to record the coordinate location of each pixel and the numerical value of each pixel; and
means for calculating the intensity centroid location of each picture using the pixel locations and numerical values, thereby locating the center of each register mark to determine the translation movement necessary to align the corresponding register mark centers.

14. Apparatus as set forth in claim 13, wherein said scanning means comprises:
means for constructing a coordinate system having mutually perpendicular x and y coordinate directions oriented parallel to the bars of the register mark;
means for erecting a pair of mutually perpendicular weighting windows extending parallel to the bars;
means for passing the window that is parallel to the y coordinate direction incrementally in the x coordinate direction over preselected pixels in each picture which contain the pixels of the bar oriented parallel to the y coordinate direction; and
means for passing the window that is parallel to the x coordinate direction numerically in the y coordinate direction over preselected pixels which contain the pixels of the bar oriented parallel to the x coordinate direction, said calculating means comprising means for calculating separately the weighted mean intensity centroid location in the x and y coordinate directions.

15. Apparatus as set forth in claim 14, wherein said erecting means comprises means for providing each window with a two pixel width dimension to resist error due to rotational effects.

16. Apparatus as set forth in claim 14, wherein said calculating means comprises means for rejecting the contribution of the pixels at each incremental position of each window unless said contribution exceeds in numerical value a preselected screening value.

17. The apparatus as set forth in claim 15, wherein said calculating means comprises:
means for computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the window that is parallel to the y coordinate direction, and the condition {i} indicates that at each coordinate i of the window that is parallel to the y coordinate, the contribution of the numerical values of the pixels in the window are disregarded unless the sum of the numerical values exceeds a preselected screening value;
means for computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

where $y_c$ is the y coordinate of the intensity centroid, j is the y coordinate locations of the window that is parallel to the x coordinate direction, and the condition {j} indicates that at each coordinate j of the window that is parallel to the x coordinate, the contribution of the numerical values of the pixels in the window are disregarded unless the sum of the numerical values exceeds a preselected screening value.

18. Apparatus for registering a pair of objects each having a border region presenting spaced apart crosshair register marks alignable to effect registration of the objects and each having mutually perpendicular first and second bars, said apparatus comprising:
means for recording a digital picture of each register mark on each object;

means for assigning to each pixel in each register mark a numerical value representative of the pixel intensity;

means for constructing a coordinate system having an x axis perpendicular to the first bar of each mark and a y axis perpendicular to the second bar of each mark;

means for erecting a first scanning window parallel to the y axis and having a width equal to a preselected number of pixels;

means for systematically scanning said first window in sequential increments in the direction of the x axis over at least the pixels which contain the first bar of each mark to record the x location and numerical value of each pixel scanned at each incremental position of said first window;

means for calculating the x coordinate centroid location based on a weighted mean determination using the x location and numerical values of the pixels;

means for erecting a second scanning window parallel to the x axis and having a width equal to a preselected number of pixels;

means for systematically scanning said second window in sequential increments in the direction of the y axis over at least the pixels which contain the second bar of each mark to record the y location and numerical value of each pixel scanned at each incremental position of said second window;

means for calculating the y coordinate centroid location based on a weighted mean determination using the y location and numerical values of the pixels; and means for determining the offsets in the x and y coordinates for each corresponding pair of register marks to thereby determine the translation movement necessary to register the objects.

19. Apparatus as set forth in claim 18, wherein:

said means for calculating the x coordinate centroid location comprises means for rejecting the contribution of the pixels at each incremental position of said first window unless said sum of the numerical values of the pixels exceeds a preselected screening value; and said means for calculating the y coordinate centroid location comprises rejecting the contribution of the pixels at each incremental position of said second window unless said sum of the numerical values of the pixels exceeds a preselected screening value.

20. Apparatus as set forth in claim 18, wherein:

said means for calculating the x coordinate centroid location comprises means for computing the centroid computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the window that is parallel to the y coordinate direction, and the condition $\{i\}$ indicates that at each coordinate i of the window that is parallel to the y coordinate, the contribution of the numerical values of the pixels in the window are disregarded unless the sum of the numerical values exceeds a preselected screening value; and computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

said means for calculating the y coordinate centroid location comprises means for computing the centroid in the y coordinate direction where $y_c$ is the y coordinate of the intensity centroid, j is the range of y coordinate locations of the window that is parallel to the x coordinate direction, and the condition $\{j\}$ indicates that at each coordinate j of the window that is parallel to the x coordinate, the contribution of the numerical values of the pixels in the window are disregarded unless the sum of the numerical values exceeds a preselected screening value.

21. Apparatus for locating the center of a crosshair register mark having first and second mutually perpendicular bars, said method comprising the steps of:

recording a digital picture of a region which contains a crosshair register mark having first and second mutually perpendicular bars;

assigning to each pixel in said region a numerical value based on the pixel intensity;

erecting first and second mutually perpendicular weighting windows oriented substantially parallel to the respective first and second bars systematically scanning each window incrementally in a direction perpendicular to the window over pixels which include the pixels containing the corresponding bar;

recording numerical values corresponding to the intensities of the pixels at each incremental position of each window; and calculating for each window a weighted mean intensity centroid location corresponding to the location of the corresponding bar, whereby the coordinates of the center of the mark are determined by the centroid location coordinates.

22. Apparatus as set for in 21, wherein each window has a width of two pixels.

23. Apparatus as set forth in claim 21, wherein said calculating means comprises means for rejecting the contribution to said weighted means intensity centroid of the pixels at each incremental position of each window unless the sum of the numerical values of the pixels exceeds a preselected screening value effective to screen out the contribution of extraneous noise.

24. Apparatus as set forth in claim 21, wherein said calculating means comprises:

means for erecting an x,y coordinate system having x and y axes parallel to the bars;

means for computing the centroid in the x coordinate direction according to the formula $$x_c = \frac{\text{SUM OVER}\{i\}: (\text{sum pair})_i \left(i + \frac{1}{2}\right)}{\text{SUM OVER}\{i\}: (\text{sum pair})_i}$$

where $x_c$ is the x coordinate of the intensity centroid, i is the range of x coordinate locations of the first window, and the condition $\{i\}$ indicates that at each coordinate i of the first window, the contribution of the numerical values of the pixels in the first window is disregarded unless the sum of the numerical values exceeds a preselected screening value;

means for computing the centroid in the y coordinate direction according to the formula $$y_c = \frac{\text{SUM OVER}\{j\}: (\text{sum pair})_j \left(j + \frac{1}{2}\right)}{\text{SUM OVER}\{j\}: (\text{sum pair})_j}$$

where $y_c$ is the y coordinate of the intensity centroid, j is the y coordinate locations of the second window, and the condition $\{j\}$ indicates that at each coordinate j of the second window, the contribution of the numerical values of the pixels in the second window is disregarded unless the sum of the numerical values exceeds a preselected screening value.

* * * * *